United States Patent [19]

Evans

[11] 4,336,667

[45] Jun. 29, 1982

[54] FRUIT CULTIVATION

[76] Inventor: Eric R. Evans, R.D. 3, Napier, New Zealand

[21] Appl. No.: 181,351

[22] Filed: Aug. 26, 1980

[30] Foreign Application Priority Data

Sep. 6, 1979 [NZ] New Zealand .................. 191490

[51] Int. Cl.³ .................................... A01G 17/06
[52] U.S. Cl. .................................... 47/58; 47/4; 47/46
[58] Field of Search .................... 47/44–46, 47/4; 174/45 R

[56] References Cited

U.S. PATENT DOCUMENTS

| | | | |
|---|---|---|---|
| 982,188 | 1/1911 | Norton | 174/45 R |
| 1,846,682 | 2/1932 | Hammel | 174/45 R |
| 3,399,852 | 9/1968 | Armstrong | 174/45 R |
| 3,526,993 | 9/1970 | Siebol | 47/46 |
| 3,585,756 | 6/1971 | Johnson | 47/46 X |

FOREIGN PATENT DOCUMENTS

| | | | |
|---|---|---|---|
| 543803 | 6/1922 | France | 47/46 |
| 445183 | 2/1968 | Switzerland | 47/46 |
| 20012 | of 1910 | United Kingdom | 47/46 |
| 704527 | 12/1979 | U.S.S.R. | 47/4 |
| 719556 | 3/1980 | U.S.S.R. | 47/4 |

Primary Examiner—Robert E. Bagwill
Attorney, Agent, or Firm—Holman & Stern

[57] ABSTRACT

A method of cultivating fruit bearing trees which involves the use of frame supported training wires, tapes or the like which extend row wise down either side of trees within a different row. Row wise extending members are provided so that a twin leader tree has each leader with oppositely and row wise directed supported laterals at preferably four levels. In addition each lateral has extending outwardly therefrom and supported by further row wise extending wires, tapes or the like fruiting branches from the laterals which by a combination of weaving over or under the same become progressively enmeshed therewith and thus are supported in a layer manner which will ensure an increased yield but at the same time facilitate the machine harvesting of any such fruit.

9 Claims, 11 Drawing Figures

FRUIT CULTIVATION

BACKGROUND OF THE INVENTION

1. Field of the Invention

The present invention relates to a method of cultivating fruit bearing trees and apparatus suitable therefor which results in the trees having a predetermined geometric layers of fruiting branches which extend outwardly normal to the row wise direction from row wise supported laterals.

2. Description of Prior Art

Methods of supporting row wise extending laterals are known. One such method is disclosed in U.S. Pat. No. 3,526,993 granted Sept. 8, 1970 to H. Siebol. In this system a single row wise extending member such as a wire supports oppositely and row wise directed laterals from a twin leader tree. The support however, involves the tying of the laterals to the supporting wire or the like and this results in a cluster of fruiting branches being disposed about the supporting wire so that the weight of the fruit (e.g. apples) is bourne by the row wise extending supporting member. A similar arrangement is disclosed in my New Zealand Patent Specification No. 186,066 which departs from the Siebol system inasfar as tying is unnecessary through the helical winding of the laterals about the row wise extending wire or the like. With such a system the annual yield of a four year old twin leader paired wire trained apple tree taken to full height (i.e. four spaced apart pairs of wires giving four levels) is approximately 4.2 packed bushels. A four year old tree of the same genus which has a single leader and is unwired has an annual yield approximately 2.05 packed bushels. The yield of an eight year old tree trained in accordance with the present invention is likely to be 2,000 to 3,000 bushels packed per acre. This compares more than favourably with 800 to 2,500 packed bushels to the acre (an average of 1,500) for an 8 year old conventional single leader free standing trees. Notwithstanding the foregoing however, and the fact that trees can be brought to bear fruit much earlier than when unsupported some considerable gains can be made by further controlling and training the growth of such trees and taking steps also to ensure the better control of the fruiting branches which will assist in pruning and also will assist in machine harvesting thereof.

BRIEF SUMMARY OF THE INVENTION

In one aspect the present invention consists in a method of training the growth of a twin leader fruit bearing tree in a row of such fruit bearing trees which comprises engaging at at least one level two laterals from one of the two leaders to a main row wise extending member selected from the group consisting wire, tapes, chain, cord, braiding, rope and string so that the distal ends of those laterals are directed oppositely and substantially in a row wise direction and simultaneously and/or subsequently training through, around, over and/or under progressively more outwardly disposed row wise extending members substantially of the same level fruiting branches from said laterals so as to leave the same enmeshed in such row wise extending members to thereby define a layer of fruiting branches.

Preferably all of said laterals in the fruiting branches thereof are trained in substantially the same manner so as to leave a series of layers of trained fruiting branches at different heights disposed on the outside of each of the leaders of each tree. Preferably there are four layers and each leader has its layers mirroring the disposition of those of the other. Preferably the trees are apple trees.

In a further aspect the present invention consists in a row of fruit bearing trees having a plurality of predetermined fruit bearing levels, each said tree having disposed upwardly and slightly outwardly with regard to the row wise direction and its trunk one of two leaders in having substantially at each predetermined level extending from each said leader two laterals which are wound about or otherwise engaged with a row wise extending member selected from the group consisting of wire, tape chain, cord, braiding, rope and string with each said lateral having fruiting branches thereof supported and constrained by a plurality of additional row wise extending members each selected from the group consisting of wire, tape, chain, cord, braiding, rope and string substantially at the level of the lateral supporting row wise extending member, the laterals and fruiting branches of each leader being supported similarly but by a different group of row wise extending members. Preferably there are four fruiting levels. Preferably said row wise extending members are supported from frames which have a single pedestal at least in positions of said row where the same are disposed between trees disposed within said row, any such frame having a plurality of paired but oppositely directed arms each arm of a pair being substantially in the plane in which all of said arms substantially lie (hereinafter called the plane of the frame) but having the distal end thereof at an outer extremity of said frame, the different pairs being spaced so as to be at different levels which correspond to the levels of said row wise extending members with each row wise extending member being engaged to means provided on each arm.

In still a further aspect the present invention consists in a frame for supporting row wise extending members for use in a method of training the growth of twin leader fruit bearing trees in a row so as to provide a row of fruit bearing trees having a plurality of predetermined fruit bearing levels with each leader at least level having row wise oppositely disposed laterals each having outwardly extending therefrom with respect to the row wise direction and the other of the two leaders a layer of supported fruiting branches, the frame having means providing a pedestal central ground engaging support and having upwardly extending therefrom means defining a skeletal frame from which a plurality of paired but oppositely directed arms extend, each arm of a pair being substantially in the plane in which all of the said arms substantially lie (hereinafter called the plane of the frame) but having the distal end thereof at an outer extremity of said frame, the different pairs being spaced so as to be at different levels when said frame is upright on the pedestal ground engaging support, and with each arm having means for engaging at an inward portion thereof a row wise extending member selected from the group consisting of a wire, tape, chain, cord, braiding, rope and string which is to extend in engagement therewith in a direction to be a row wise direction in use, which is substantially normal to the plane of said frame, and having means spaced outwardly therefrom capable of engaging at least one further substantially parallel row wise member selected from the group consisting of a wire, tape, chain, cord, braiding, rope or string.

Preferably each arm has at least three means for engagement to a said row wise extending member. Preferably each said means for engaging a row wise extending member includes finger members pressed from sheet material in which each arm is formed, said finger member capable of having received thereunder said row wise extending member and holding the same down against the portion of metal from which it has been pressed.

From the foregoing therefore it can be seen that the present invention relates to means and methods applicable to the training of trees such that a canopy like layer of fruiting branches is achieved in a predetermined manner at a plurality of heights and outwardly of each of two leaders of a two leader tree thus leading to greater light access to the fruiting branches as well as providing greater support for any fruit that may be yielded thereby. The layered disposition also facilitates machine harvesting. Accordingly it is an object of the present invention to provide means and/or methods which will go some way to increasing the yield of fruit bearing trees and/or enhance the machine harvesting capability of the fruit born thereby.

BRIEF DESCRIPTION OF THE DRAWINGS

One preferred form of the present invention will now be described with reference to the accompanying drawings in which:

FIG. 9, and FIG. 11 shows the manner in which fruiting branches can be woven under or over and of course such training can be done whenever a fruiting branch is pruned or seen to be no longer supported, the beauty of the system being of course that attachment ties and the like are not necessary and therefore a person spotting a branch that is unsupported can simply engage the same in the appropriate manner without need to obtain specialised equipment.

DETAILED DESCRIPTION

Figure 10:
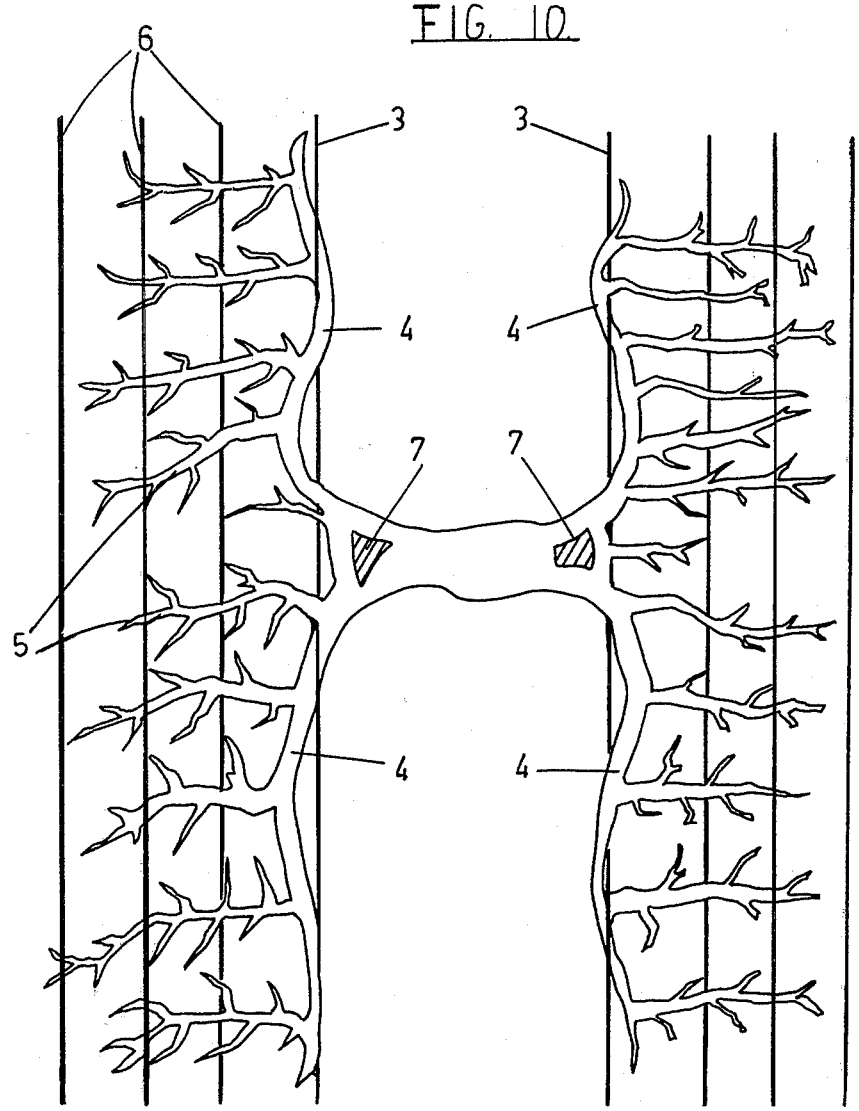
FIG. 10 shows a plane view of a tree of a kind as shown in FIG. 9 showing a single level with the twin leaders thereof being disposed to grow apart and outwardly to facilitate the attachment of the paired laterals to the inner of the row wise extending wires so that outwardly directed fruiting branches can be engaged by weaving over or under the additional row wise extending members which are to support the same in a canopy like manner for each of the levels shown in e.g.
Figure 11:
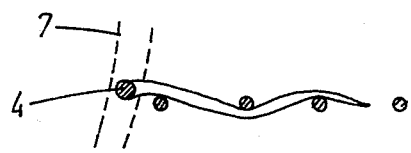

The preferred form of the present invention will be described with reference to an apple plantation which is to be supported at four levels. Apparatus of the present invention as shown in FIGS. 1 to 4 consists of frames which are e.g. 96″ high and formed by appropriately sectioned metal members so as to provide outwardly extending arms which lie in the plane of each frame member each arm have substantially identical pressed out members for engagement with row wise extending wire or the like other members. Preferably however, wires are preferred for apple trees. For other fruit cords or strings may be more appropriate e.g. plums. However, the inner row wise engaging means 1 of each pair of arms whether it be an end supporting frame or an intermediate supporting frame for each level are spaced apart e.g. about 20″. Preferably the height between adjacent levels of arms is approximately 20″. The lower layer of row wise extending members is 34″ from the ground. A feature of the present invention is the provision of a plurality of additional engagement means or lugs 2 which will support wires in a layered array as shown in FIG. 10. In this respect it can be seen that the members 1 of the frames (not shown) can support inner wires 3 about which or to which the laterals 4 of a twin leader tree can be held, engaged or attached (hereinafter referred to simply as "engated") under the influence of the fruiting branches 5 which are wound in the manner as shown e.g. in FIG. 11 with the more outwardly disposed row wise extending wires 6. As can be envisaged therefore similar arrays can be provided upwardly with the laterals 4 that extend further upwardly from each of the preferred two laterals 7 of a preferred two lateral tree.

As can be seen preferably the space between a wire 3 and the closest of the wires 6 is slightly further apart than the space between the associated wire 6. This is to allow an easier bending of the fruiting branches at the thicker regions thereof.

Figure 1:
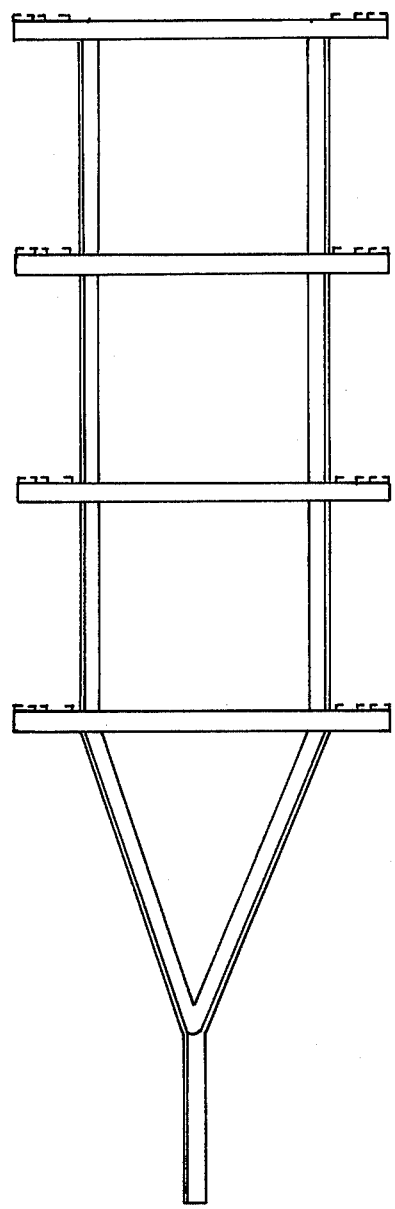
FIG. 1 is an elevational view normal to the plane of a frame with its pedestal ground support e.g. receivable within a ground located socket or simply the ground itself showing how substantially parallel outwardly extending paired arm members include thereon means capable of engaging a plurality of row wise extending members (hereinafter referred to simply as wires) so as to support first the row wise extending laterals and then to enmesh the outwardly directed fruiting branches.
Figure 2:
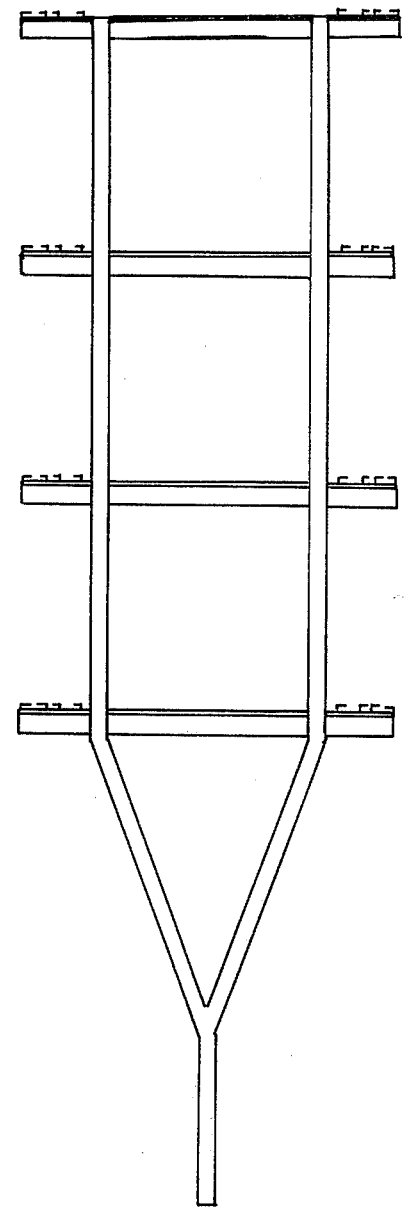
FIG. 2 is a view of the other side of the member of FIG. 1.
Figures 3, 4:
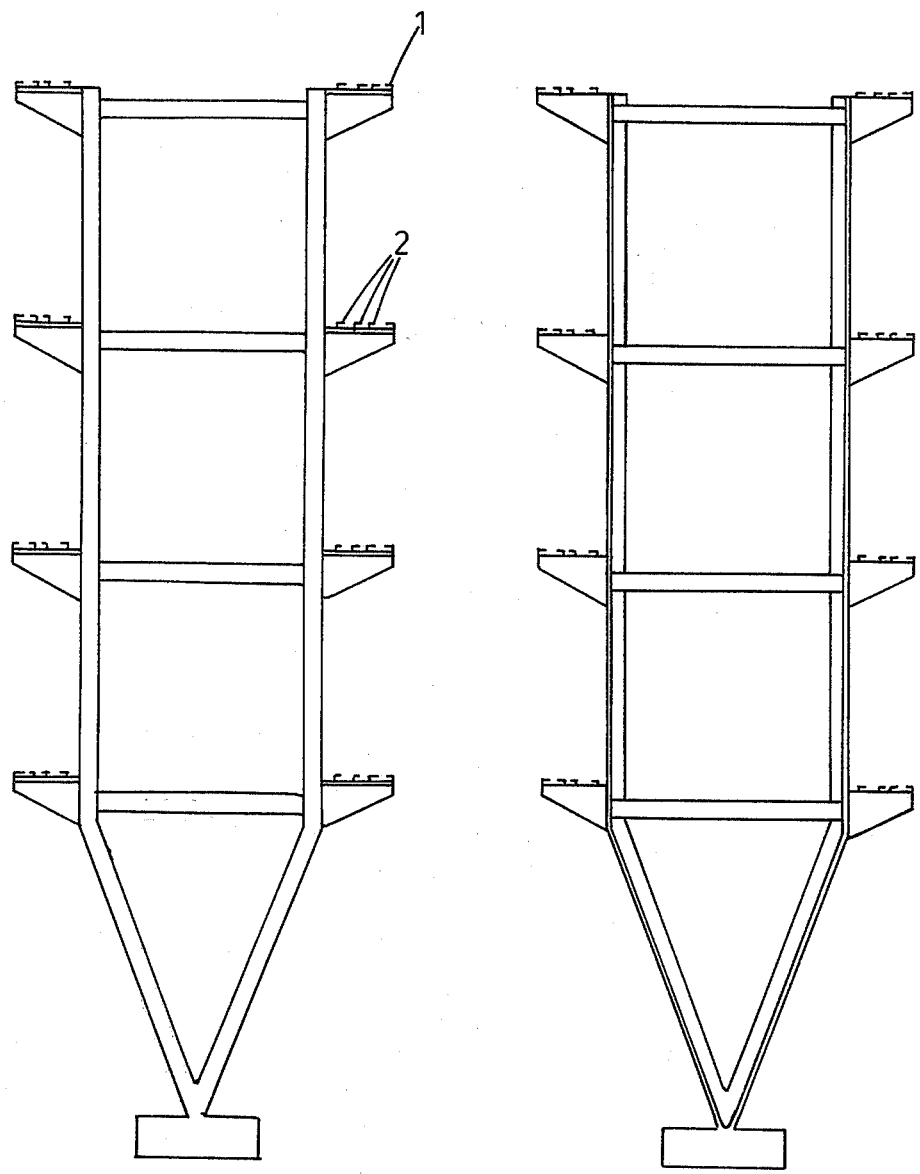
FIG. 3 is a similar view to that of FIGS. 1 and 2 but showing a more solid frame for location at the end of each row, such a member including a ground locating member which will resist the tendancy to move in towards the end tree of a row, the outward extending arms also including engagement means corresponding to those of the frames of FIGS. 1 and 2.
FIG. 4 is a view of the other side of the frame of FIG. 3.
Figure 5:
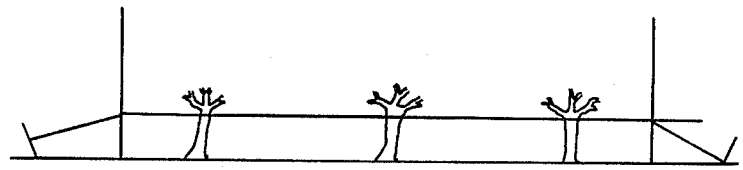
FIG. 5 shows a first stage of the training with an end frame substantially as shown in FIG. 3 being located and having strung therebetween at least two row wise extending wires to which the laterals will be attached e.g. by helical winding.
Figure 6:
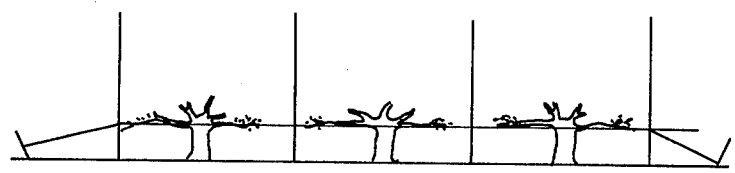
FIG. 6 shows the arrangement with such lateral of a plurality of trees attached to such members and with intermediate supports such as shown in FIGS. 1 and 2 located to support intermediate sections of the row wise extending wire.
Figure 7:
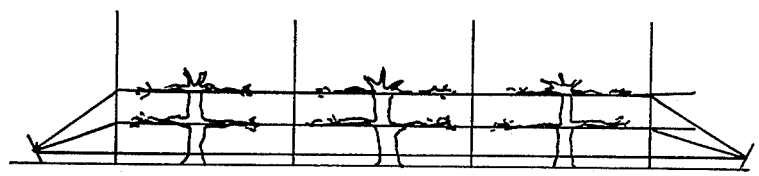
FIG. 7 shows a second level with the laterals thereof similarly engaged or held to a wire (e.g. by constraints on any fruiting branches)
Figure 8:
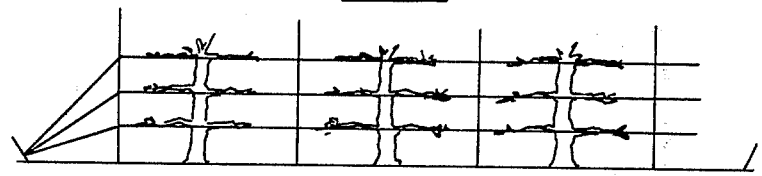
FIG. 8 shows a further level.
Figure 9:
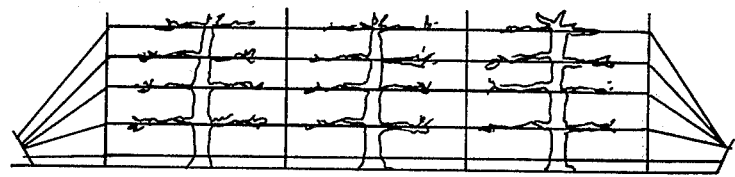
FIG. 9 shows still a further level, FIGS. 5 to 9 of course showing only the laterals of the near side of a preferred twin leader tree.

The arrangement as shown diagrammatically in FIG. 5 through to FIG. 9 will now be described. From the outset a row of trees e.g. apple trees, will be planted such that the same have the twin leaders thereof arranged so as to produce laterals that can be trained progressively at the spaced apart heights. In this respect of course the frame and the row wise extending members can be progressively attached in any suitable order but it is envisaged that at least some row wise extending members will be provided as e.g. shown in FIG. 5 at the stage when the first pruning occurs. In this respect it can be seen diagrammatically that end pegs or the like support the end of the row wise members which extend down from an arm of an end supporting frame substantially as shown with a more or less pedestal type support in FIGS. 2 and 3. The pruning of the branches at each level would be such that a leader is encouraged to sprout oppositely directed laterals approximately 6" or 8" below the level of the wire 3 with it is to be associated. Preferably the trees in a row are planted 10' to 15' apart.

The frames for supporting the wires or other members are preferably formed from metal and these ideally are dip galvanized fourteen gauge steel or heavier members of appropriate dimensions to support the weight. Of course after a period of time the tree will be able to support much of its own weight but at least when younger and when fruit bearing which will occur younger than normal some considerable support is necessary. The use of the pedestal type arrangement will facilitate the control of ground growth around the trees and also will enable e.g. drip trays or the like to be inserted under each layer so as to save as far as possible any waste spray liquids thereby leading to some economic advantage. Of course also with the layer type arrangement it is possible for the sprays to be applied directly onto the fruiting branches from both above and below the layer. Of course also it can be seen that the layer type arrangement facilitates the harvesting possibility of such trees and particularly that using a machine which can e.g. vibrate or suck fruit off the tree. It has been already shown that in addition to better geometric control of a tree layout which would facilitate mechanical harvesting the arrangement in accordance with the present invention with its controlled fruiting branches yields fruit in excess of the increased yield envisaged and obtained with respect of my system as disclosed in New Zealand Pat. No. 186,066. Therefore it is believe that the only moderately greater capital investment necessary to use the present invention will be more than fully off-set in a short period. Certainly it will be greatly attractive to orchardists not already committed to some existing retraining system. The present invention has particular application for apples although it does have application with other fruits e.g. plums and the like. Depending of course however on the tree and the fruit various spacings will be required and of course the material of the row wise extending materials should be varied to minimise damage to some trees which are more susceptible to damage than others. Apple trees however are perfectly happy with straight galvanised wire.

It is believed therefore that the present invention in its various forms will find widespread acceptance in the orcharding industry.

What is claimed is:

1. A method of training the growth of a twin leader fruit bearing tree in a row of such fruit bearing trees which comprises engaging or holding at at least one level two laterals from one of the two leaders to a main row wise extending member selected from the group consisting wire, tapes, chain, cord, braiding, rope and string so that the distal ends of those laterals are directed oppositely and substantially in a row wise direction and simultaneously and/or subsequently training through, around, over and/or under progressively more outwardly disposed row wise extending members substantially of the same level fruiting branches from said laterals so as to leave the same enmeshed in such row wise extending members to thereby define a layer of fruiting branches.

2. A method as claimed in claim 1 wherein all of said laterals and the fruiting branches thereof are trained in substantially the same manner so as to leave a series of layers of trained fruiting branches at different heights disposed on the outside of each of the leaders of each tree.

3. A method as claimed in claim 2 wherein there are four layers and each leader has its layers's mirroring the disposition of those of the other.

4. A method of claimed in claim 1 wherein said trees are apple trees.

5. A row of fruit bearing trees having a plurality of predetermined fruit bearing levels, each said tree having disposed upwardly and slightly outwardly with regard to the row wise direction and its trunk one of two leaders in having substantially at each predetermined level extending from each said leader two laterals which are wound about or otherwise engaged with a row wise extending member selected from the group consisting of wire, tape chain, cord, braiding, rope and string with each said lateral having fruiting branches thereof supported and constrained by a plurality of additional row wise extending members each selected from the group consisting of wire, tape, chain, cord, braiding, rope and string substantially at the level of the lateral supporting row wise extending member, the laterals and fruiting branches of each leader being supported similarly but by a different group of row wise extending members.

6. A row as claimed in claim 5 wherein there are four fruiting levels.

7. A row as claimed in claim 5 wherein said row wise extending members are supported from frames which have a single pedestal at least in positions of said row where the same are disposed between trees disposed within said row, any such frame having a plurality of paired but oppositely directed arms each arm of a pair being substantially in the plane in which all of said arms substantially lie (hereinafter called the plane of the frame) but having the distal end thereof at an outer extremity of said frame, the different pairs being spaced so as to be at different levels which correspond to the levels of said row wise extending members with each row wise extending member being engaged to means provided on each arm.

8. A frame for supporting row wise extending members for use in a method of training the growth of twin leader fruit bearing trees in a row so as to provide a row of fruit bearing trees having a plurality of predetermined fruit bearing levels with each leader at least level having row wise oppositely disposed laterals each having outwardly extending therefrom with respect to the row wise direction and the other of the two leaders a layer of supported fruiting branches, the frame having means providing a pedestal central ground engaging support and having upwardly extending therefrom means defining a skeletal frame from which a plurality of paired but oppositely directed arms extend, each arm of a pair being substantially in the plane in which all of the said arms substantially lie (hereinafter called the plane of the frame) but having the distal end thereof at an outer extremity of said frame, the different pairs being spaced so as to be at different levels when said frame is upright on the pedestal ground engaging support, and with each arm having means for engaging at an inward portion thereof a row wise extending member selected from the group consisting of a wire, tape, chain, cord, braiding, rope and string which is to extend in engagement therewith in a direction to be a row wise direction in use, which is substantially normal to the plane of said frame, and having means spaced outwardly therefrom capable of engaging at least one further substantially parallel row wise member selected from the group consisting of a wire, tape, chain, cord, braiding, rope or string, each said means for engaging a row wise extending member including finger members pressed from sheet material in which each arm is formed, said finger member capable of having received thereunder said row wise extending member and holding the same down against the portion of metal from which it has been pressed.

9. A frame as claimed in claim 8 wherein each arm has at least three means for engagement to a said row wise extending member.

* * * * *